(12) United States Patent  (10) Patent No.: US 8,204,339 B2
Heaney, Jr. et al.  (45) Date of Patent: Jun. 19, 2012

(54) PHOTOGRAPHIC DOCUMENT IMAGING SYSTEM

(75) Inventors: Edward P. Heaney, Jr., Long Beach, CA (US); Zachary Andree, Brookiline, MA (US); Zachariah Clegg, Seattle, WA (US); James Darpinian, Redondo Beach, CA (US); Kurt A. Rapelje, Hawthorne, CA (US); William J. Adams, Long Beach, CA (US); Zachary B. Dodds, Claremont, CA (US)

(73) Assignee: Compulink Management Center, Inc., Long Beach, CA (US)

( * ) Notice: Subject to any disclaimer, the term of this patent is extended or adjusted under 35 U.S.C. 154(b) by 380 days.

(21) Appl. No.: 12/479,708

(22) Filed: Jun. 5, 2009

(65) Prior Publication Data

US 2009/0237531 A1 Sep. 24, 2009

Related U.S. Application Data

(62) Division of application No. 10/928,761, filed on Aug. 26, 2004, now Pat. No. 7,593,595.

(51) Int. Cl.
*G06K 9/36* (2006.01)
(52) U.S. Cl. ......... 382/276; 382/103; 382/112; 382/113
(58) Field of Classification Search .................. 382/103, 382/112, 113, 314, 315, 317
See application file for complete search history.

(56) References Cited

U.S. PATENT DOCUMENTS

| | | | |
|---|---|---|---|
| 4,783,833 A | 11/1988 | Kawabata et al. | |
| 5,280,367 A | 1/1994 | Zuniga | |
| 5,280,546 A | 1/1994 | Machida et al. | |
| 5,357,118 A * | 10/1994 | Fukuoka et al. | 250/582 |
| 5,377,019 A | 12/1994 | Okisu et al. | |
| 5,497,236 A * | 3/1996 | Wolff et al. | 358/296 |
| 5,515,181 A | 5/1996 | Iyoda et al. | |
| 5,585,926 A * | 12/1996 | Fujii et al. | 358/471 |
| 5,585,962 A | 12/1996 | Dixon | |
| 5,677,776 A | 10/1997 | Matsuda et al. | |
| 5,712,486 A * | 1/1998 | Soltani et al. | 250/484.4 |
| 5,742,354 A | 4/1998 | Vlahos et al. | |
| 5,764,228 A | 6/1998 | Baldwin | |
| 5,764,383 A | 6/1998 | Saund et al. | |
| 5,774,237 A | 6/1998 | Nako | |
| 5,831,750 A | 11/1998 | Okisu et al. | |

(Continued)

FOREIGN PATENT DOCUMENTS

EP  0 949 802 A2  10/1999

(Continued)

OTHER PUBLICATIONS

Document Copy Stand and Digital Camera, Sky Mall Magazine, Late Spring 2004, p. 5, American Airlines.

(Continued)

*Primary Examiner* — Yosef Kassa
(74) *Attorney, Agent, or Firm* — Dickstein Shapiro LLP

(57) ABSTRACT

An apparatus and method for processing a captured image and, more particularly, for processing a captured image comprising a document. In one embodiment, an apparatus comprising a camera to capture documents is described. In another embodiment, a method for processing a captured image that includes a document comprises the steps of distinguishing an imaged document from its background, adjusting the captured image to reduce distortions created from use of a camera and properly orienting the document is described.

5 Claims, 14 Drawing Sheets

U.S. PATENT DOCUMENTS

| | | | |
|---|---|---|---|
| 5,848,183 | A | 12/1998 | Farrell |
| 6,011,635 | A | 1/2000 | Bungo et al. |
| 6,014,470 | A | 1/2000 | Matsuda |
| 6,064,778 | A | 5/2000 | Pasco et al. |
| 6,134,346 | A | 10/2000 | Berman et al. |
| 6,282,326 | B1 | 8/2001 | Lee et al. |
| 6,304,313 | B1 | 10/2001 | Honma |
| 6,310,984 | B2 | 10/2001 | Sansom-Wai et al. |
| 6,385,347 | B1 | 5/2002 | Matsuda |
| 6,430,320 | B1 | 8/2002 | Jia et al. |
| 6,453,056 | B2 | 9/2002 | Laumeryer et al. |
| 6,525,741 | B1 | 2/2003 | Klassen et al. |
| 6,630,938 | B1 | 10/2003 | Nanni |
| 6,633,332 | B1 | 10/2003 | Nay et al. |
| 6,687,420 | B1* | 2/2004 | Matsuda et al. ............. 382/286 |
| 6,716,175 | B2 | 4/2004 | Geiser et al. |
| 6,731,718 | B2* | 5/2004 | Ogura et al. .................... 378/63 |
| 6,746,029 | B2* | 6/2004 | Chu et al. .................. 280/47.35 |
| 6,750,974 | B2 | 6/2004 | Svetkoff et al. |
| 6,771,834 | B1 | 8/2004 | Martins et al. |
| 6,806,903 | B1 | 10/2004 | Okisu et al. |
| 6,839,463 | B1 | 1/2005 | Blake et al. |
| 6,847,737 | B1 | 1/2005 | Kouri et al. |
| 6,873,732 | B2 | 3/2005 | Dance |
| 6,885,479 | B1 | 4/2005 | Pilu |
| 6,954,290 | B1 | 10/2005 | Braudaway et al. |
| 6,956,587 | B1 | 10/2005 | Anson |
| 6,975,360 | B2* | 12/2005 | Slatter .......................... 348/370 |
| 6,985,555 | B2* | 1/2006 | Endo ......................... 378/98.11 |
| 7,092,548 | B2 | 8/2006 | Laumeyer et al. |
| 7,121,469 | B2 | 10/2006 | Dorai et al. |
| 7,330,604 | B2 | 2/2008 | Wu et al. |
| 7,418,126 | B2 | 8/2008 | Fujimoto et al. |
| 2002/0044681 | A1 | 4/2002 | Fujimoto et al. |
| 2003/0026482 | A1 | 2/2003 | Dance |
| 2003/0048271 | A1 | 3/2003 | Liess et al. |
| 2003/0053692 | A1 | 3/2003 | Hong et al. |
| 2004/0012679 | A1 | 1/2004 | Fan |
| 2004/0022451 | A1 | 2/2004 | Fujimoto et al. |
| 2004/0099741 | A1 | 5/2004 | Dorai et al. |
| 2005/0053304 | A1 | 3/2005 | Frei |
| 2005/0175255 | A1 | 8/2005 | Fujimoto et al. |
| 2006/0045379 | A1 | 3/2006 | Heaney et al. |
| 2006/0140504 | A1 | 6/2006 | Fujimoto et al. |
| 2007/0206877 | A1 | 9/2007 | Wu et al. |
| 2007/0253031 | A1 | 11/2007 | Fan |

FOREIGN PATENT DOCUMENTS

| | | | |
|---|---|---|---|
| EP | | 1571820 A2 | 9/2005 |

OTHER PUBLICATIONS

Digital Presenter, NEC Projectors Web Site: DV11, http://www.nec-pj.com/products/dv/, Aug. 2005.

Patented Xerox Technology Could Turn Camera Phone into Portable Scanner, PhoneContent.com, http://www.phonecontent.com/bm/news/gnews/584.shtml, Nov. 17, 2004.

Document Imaging With Cameras, Xerox website, http://www.xeroxtechnology.com/ipl.nsf/sedan1?readform&unid=6192C61923FED63885256FCC00691EEF, Mar. 2005.

Document Imaging With Cameras, Xerox Research Centre Europe, Mar. 2005.

An Office Action mailed Feb. 23, 2007 regarding U.S. Appl. No. 11/368,260, filed Mar. 2, 2006.

Zheng Zhang, Chew Lim Tan, and Liying Fan, "Restoration of Curved Document Images Through 3D Shape Modeling," Proceedings of the 2004 IEEE Computer Society Conference on Computer Vision and Pattern Recognition, 2004.

Tapas Kanungo, Robert M. Haralick, and Ihsin Phillips, "Global and Local Document Degradation Models," Proceedings of the Second International Conference on Document Analysis and Recognition, pp. 730-734, 1993 IEEE.

Michael S. Brown and Desmond TSOI, "Correcting Common Distortions in Camera-Imaged Library Materials," Proceedings of the 2003 Joint Conference on Digital Libraries (JCDL '03), 2003.

Huaigu Cao, Xiaoqing Ding, and Changsong Liu, "Rectifying the Bound Document Image Captured by the Camera: A Model Based Approach," Proceedings of the Seventh International Conference on Document Analysis and Recognition (ICDAR '03), 2003.

John Canny, "A computational Approach to Edge Detection," IEEE Transactions on Pattern Analysis and Machine Intelligence, vol. PAMI-8, No. 6, pp. 679-698, Nov. 1986.

Jianping Fan, David, K.Y. Yau, Ahmed K. Elmagarmid, and Walid G. Aref, "Automatic Image Segmentation by Integrating Color-Edge Extraction and Seeded Region Growing," IEEE Transactions on Image Processing, vol. 10, No. 10, Oct. 2001.

Yue Lu, and Chew Lim Tan, "Improved Nearest Neighbor Based Approach to Accurate Document Skew Estimation," Proceedings of the Seventh International Conference on Document Analysis and Recognition (ICDAR 2003), 2003.

Mario I. Chacon Murgula, "Document Segmentation Using Texture Variance and Low Resolution Images," 1998 IEEE Southwest Symposium on Image Analysis and Interpretation, pp. 164-167, Apr. 1998.

Victor Wu, R. Manmatha, and Edward M. Riseman, "Finding Text in Images," Proceedings of the Second ACM International Conference on Digital Libraries, Jul. 1997.

Mitsuru Yamada and Kazuo Hasuike, "Document Image Processing Based on Enhanced Border Following Algorithm," Proceedings of the 10th International Conference on Pattern Recognition, vol. II, pp. 231-236, Jun. 1990.

S.D. Yanowitz and A.M. Bruckstein, "A New Method for Image Segmentation," Proceedings of the $9^{th}$ International Conference on Pattern Recognition, vol. 1, pp. 270-275, Nov. 1998.

Rafael Dueire Lins and Bruno Tenorio Ávila, "A New Algorithm for Skew Detection in Images of Documents," pp. 234-240, Springer-Vering Berlin/ Heidelberg, 2004.

Wayne Niblack, "An Introduction to Digital Image Processing," Section 5.1, pp. 113-117, Prentice Hall International, 1985.

Maurizio Pilu, "Extraction of Illusory Linear Clues in Perspectively Skewed Documents," Proceedings of the 2001 IEEE Computer Society Conference on Computer Vision and Pattern Recognition (CVPR 2001), pp. 1-363-1-368, Dec. 2001.

Lakshmand Prasad, "Morphological Analysis of Shapes," T-DOT, Theoretical Division, pp. 1-18, Jul. 1997.

J. Sauvola and M. Pietikäinen, "Adaptive Document Image Binarization," Pattern Recognition, vol. 33, pp. 225-236, 2000.

Osamu Shiku, Akira Nakamura, Masanori Anegawa, Hideaki Takahira, and Hideo Kuroda, "Extraction of Slant Character Candidates from Maps Using Circular Templates," Proceedings of the Third International Conference on Document Analysis and Recognition, vol. II, pp. 936-939, Aug. 1995.

Cedric A. Zala and Ian Barrodale, "Warping Aerial Photographs to Orthomaps Using Thin Plate Splines," Advances in Computational Mathematics, vol. 11, pp. 211-227, 1999.

Milan Sonka, Vaclav Hlavac, Roger Boyle: Image Processing, Analysis, and Machine Vision', Mar. 19, 2007, CL Engineering, XP002633279, p. 221.

Extended European Search Report dated Apr. 29, 2011 issued to European Application No. 08767496.6.

Daniel S. Le, George R. Thomas, Harry Wechsler, "Automated Page Orientation and Skew Angle Detection for Binary Document Images" Pattern Recognition, vol. 27, No. 10, pp. 1325-1344, 1994, Great Britain.

Aditya Vailaya, HongJiang Zhang, Changjiang Yang, Feng-I Liu, Anil K. Jain, "Automatic Image Orientation Detection", IEEE Transactions on Image Processing, vol. 11 No. 7, pp. 746-755, Jul. 2002.

Martin A. Fischler, Robert C. Bolles, "Random Sample Consensus: A Paradigm for Model Fitting with Applications to Image Analysis and Automated Cartography", Communications of the ACM vol. 24 No. 6, pp. 381-395, Jun. 1981.

Robert S. Caprari, "Algorithm for text page up/down orientation determination", Pattern Recognition Letters 21, Elsevier Science B.V., pp. 311-317, 1999 Australia.

\* cited by examiner

PHOTOGRAPHIC DOCUMENT IMAGING SYSTEM

CROSS REFERENCE TO RELATED APPLICATIONS

This is a divisional application of U.S. patent application Ser. No. 10/928,761, filed Aug. 26, 2004 now U.S. Pat. No. 7,593,595, which is incorporated herein by reference.

FIELD

An apparatus and method for processing a captured image and, more particularly, for processing a captured image comprising a document.

BACKGROUND

FIG. 1-A is a block diagram depicting typical components of a scanner. A scanner is typically used to capture an image of a document 110. A document 110 is placed on the scanner plate 112. A scan head 120, which is generally comprised of an optical subsystem 122 and a charge-coupled device ("CCD") 124, is moved across the document 110. Although FIG. 1A depicts only a two dimensional view, the scan head 120 may move across the document in both the direction illustrated by arrow 114 and in a direction orthogonal to the document 110. The optical subsystem 122 focuses light reflected from document 110 onto a CCD 124. CCD 124 is often implemented as a two-dimensional array of photosensitive capacitive elements. When light is incident on the photosensitive elements of the CCD 124, charge is trapped in a depletion region of the semiconductor elements. The amount of charge associated with the photosensitive capacitive elements is related to the intensity of light incident on the respective elements received over a sampling period. Accordingly, the image is captured by determining the intensity of incident light at the respective photosensitive capacitive elements via sampling the elements. The analog information produced by the photosensitive capacitive elements is converted to digital information by an analog-to-digital (A/D) converter 130. An A/D converter 130 may convert the analog information received from CCD 124 in either a serial or parallel manner. The converted digital information may be stored in memory 140. The digital information is then processed by a processor 150 according to control software stored in ROM 180. The user may control scanning parameters via user interface 170 and the scanned image is outputted through output port 160.

A block diagram of a digital camera is depicted in FIG. 1B. An optical subsystem 122 of a digital camera may be used to focus light reflected from a document 110 onto a CCD 124, much as in the scanner. In other digital cameras, devices other than a CCD are used to capture the light reflected from the image, such as CMOS sensors. In the context of a digital camera, as opposed to a scanner, the optical subsystem 122 is not moved along the surface of the document, as in a scanner. Rather, in a digital camera, the optical system 122 is generally stationary with respect to the object, such as a document, to be imaged. In addition to digital cameras, photographs captured from film-based cameras may also be digitized.

Cameras offer significant advantages over scanners for capturing document images and other images. For example, cameras are generally more portable than scanners. In addition, because scanners require a captured image to be placed on the scanner plate, cameras are capable of capturing a wider array of images than scanners. However, the use of cameras creates difficulties in image capturing that do not exist when using a scanner. For example, light conditions vary when using a camera, whereas the light conditions are generally controlled in scanners. In addition, use of a camera introduces image distortions, which may depend on various variables, such as the angle of the camera relative to the image, the lens used by the camera and its distance from the image, whether the image including a document is situated on a flat or curved surface and other factors. Because the scanner utilizes a moving scanner head, at a fixed distance from a document to be imaged, these distortions do not generally occur in scanners.

Therefore, a need exists for an apparatus and method for capturing images of documents that utilizes the advantages of cameras over scanners, yet reduces the difficulties presented by capturing document images via a camera as opposed to a scanner.

BRIEF SUMMARY

An apparatus and method for processing a captured image that comprises an imaged document are described. In one embodiment, the apparatus comprises a stationary camera, which is utilized to capture the imaged document. In another embodiment, a non-stationary camera is utilized to capture the imaged documents. In yet another embodiment, a method for processing a captured image that includes a document comprises the steps of distinguishing an imaged document from its background, adjusting the captured image to reduce distortions created from use of a camera and properly orienting the document.

DETAILED DESCRIPTION OF PREFERRED EMBODIMENTS

Embodiments described herein are operable to process an image captured from a camera that comprises a document. Embodiments described herein are operable to identify the captured document image from its background. After the captured document image is isolated from its background, embodiments described herein are operable to reduce or remove distortions of the captured document image. After the distortion of the captured document image is corrected, embodiments described herein are operable to rotate the captured document image to its proper orientation. Additionally, embodiments described herein provide the user with an evaluation of the success of implementing each of the steps in its various embodiments.

Figure 1A:
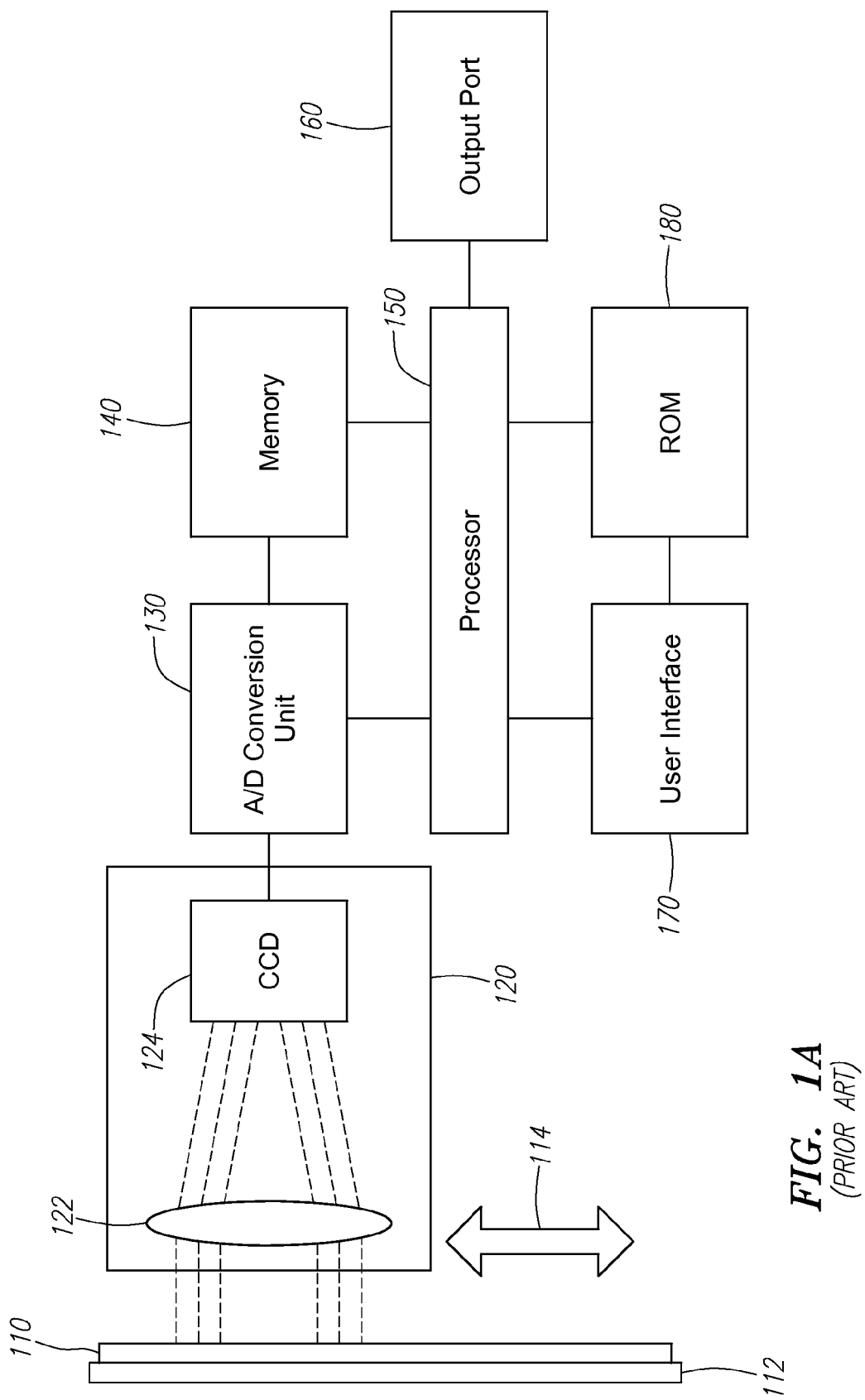
FIG. 1A depicts a prior art document scanner.
Figure 1B:
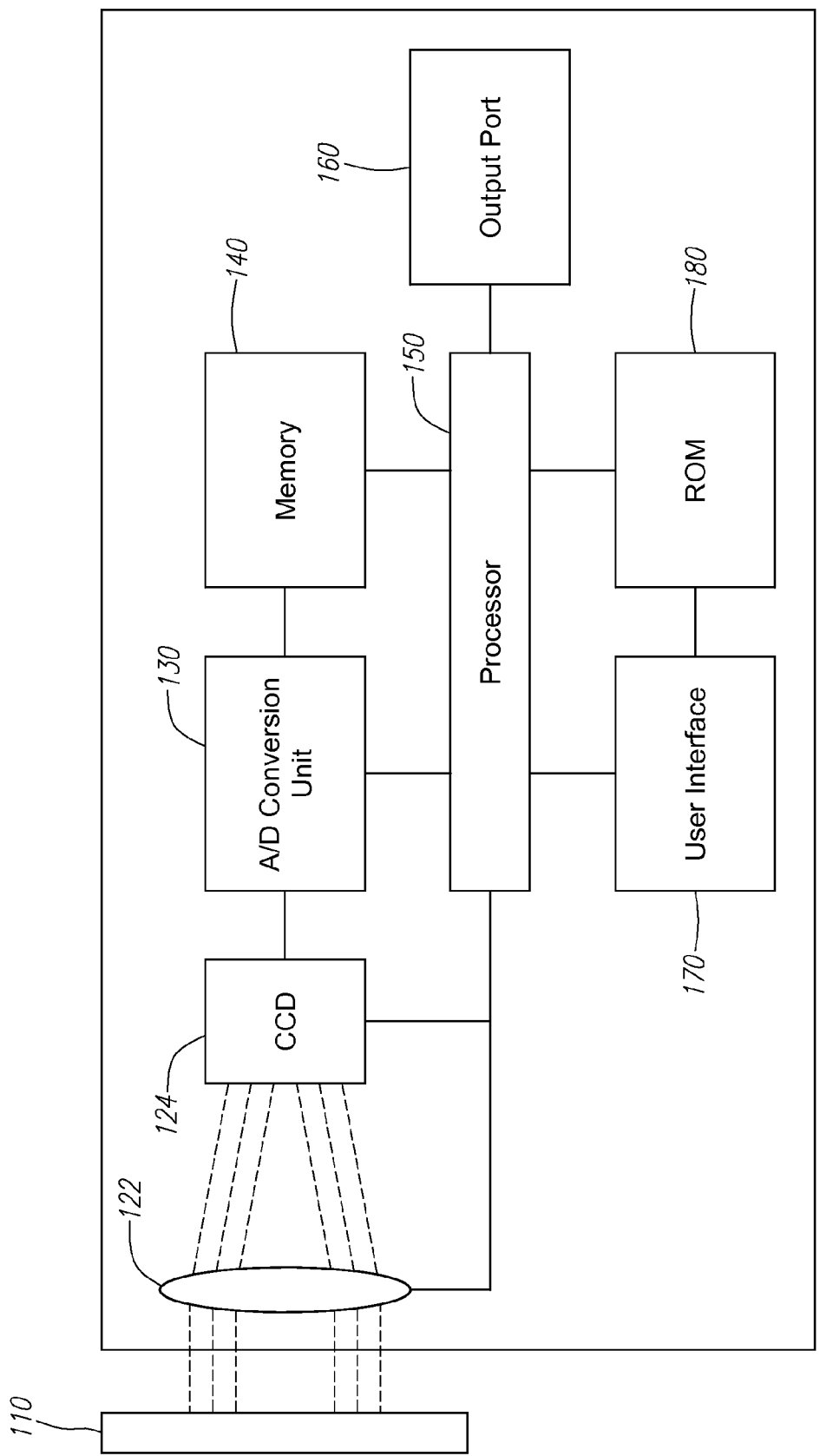
FIG. 1B depicts a prior art digital camera.
Figure 2:
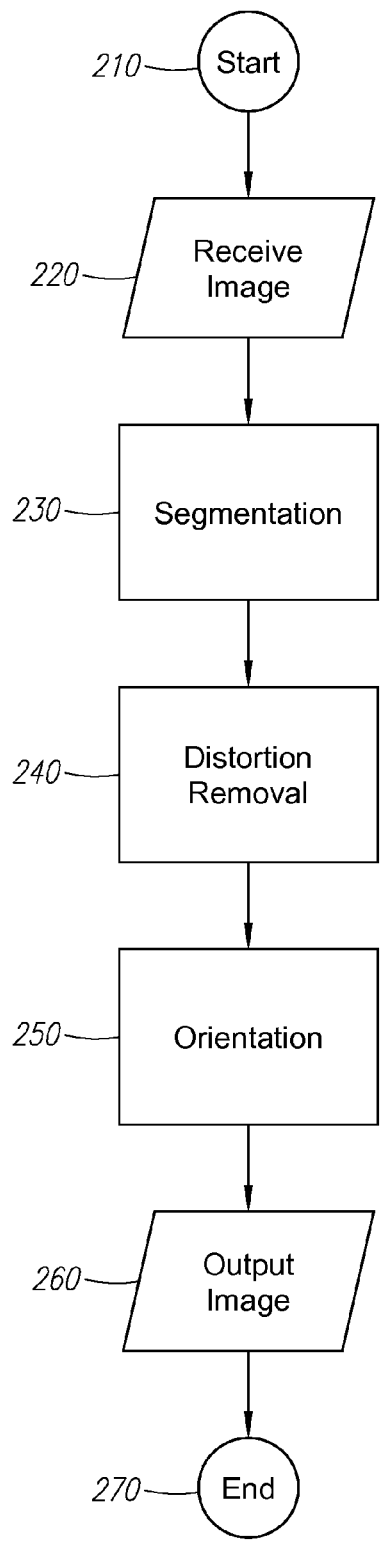
FIG. 2 depicts a general flowchart of a method for processing a captured image.

FIG. 2 depicts a general flowchart of a method for processing a captured image. After start 210, an image is received in step 220. The image received in step 220 comprises a document image. The image may be received from various sources. For example, in one embodiment, the image may be received from a digital camera. In another embodiment, the image may be received from a stationary unit comprising a digital camera. In yet another embodiment, the image may be received from a film photograph that has been digitized. Step 230 operates to identify the captured document image from the remainder of the image, or the background. Step 230 is referred to as segmentation. This step 230 may operate to detect the edges of the captured document image. This step 230 may also operate to crop the background of the image from the captured document image so as to separate the document from its background. Step 240, referred to as distortion removal, operates to reduce or remove the distortions of the captured document image. Some of the distortions which this step 240 may operate to correct are perspective distortions, lens distortions and light distortions. Other distortions may also be corrected in this step 240. Step 250 operates to correct the orientation of the document. This step 250 may operate to determine whether the captured document image should be in a portrait or landscape orientation and to rotate the captured document image accordingly. This step 250 may also operate to determine whether the captured document image is upside down and to rotate the captured document image accordingly. In step 260 the processed document image is outputted. The processed document image may be outputted 260 through various means, such as displaying an image of the processed document image on a monitor, saving the processed document image to a computer file, electronically transmitting the document image, or printing the processed document image.

Figure 3:
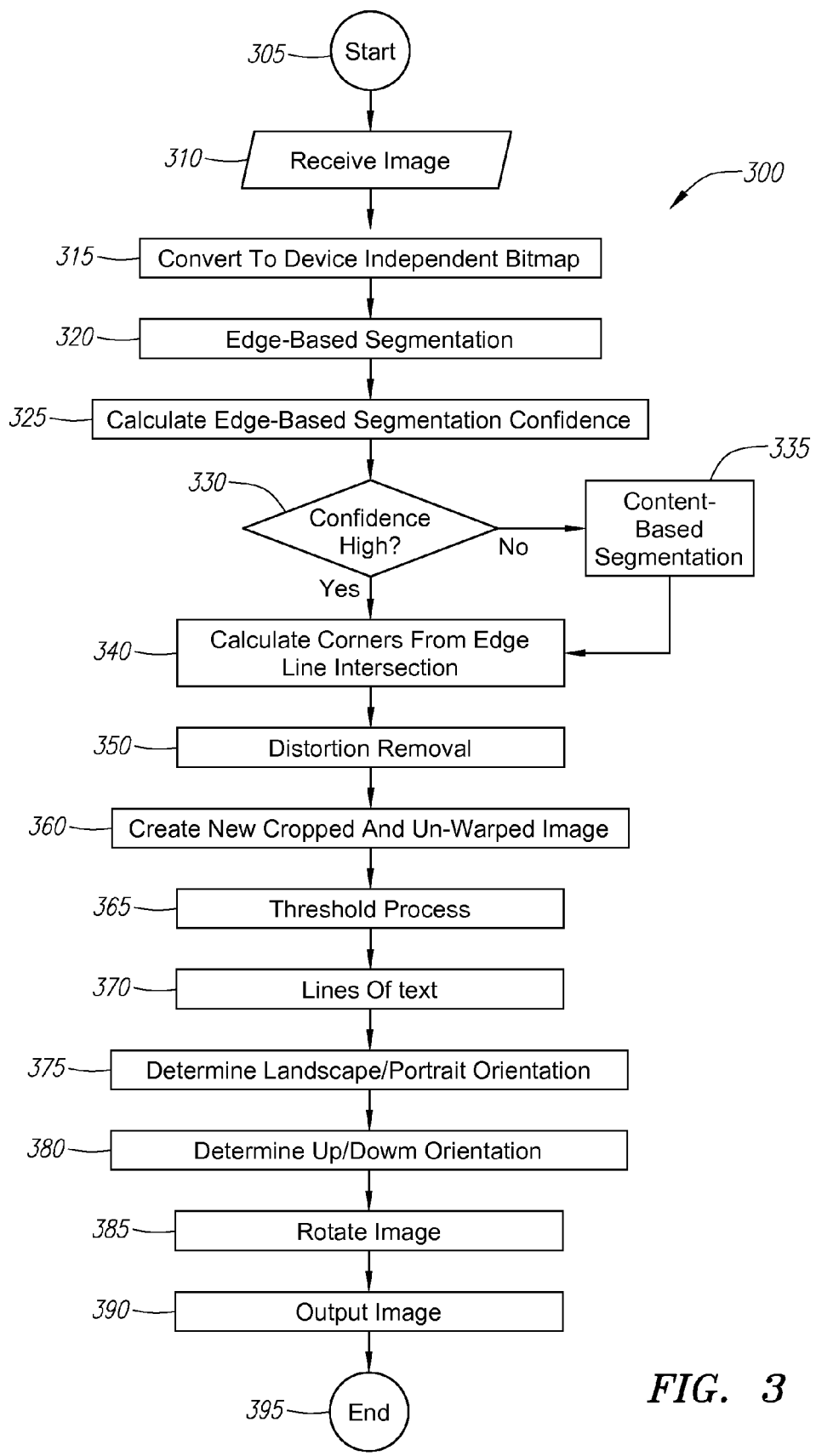
FIG. 3 depicts a flowchart of another embodiment of a method for processing a captured image.

FIG. 3 depicts a flowchart 300 of another embodiment of a method for processing a captured image. After start 305, the image is received 310. In step 315 the received image is converted into a device independent bit map. In step 320 segmentation is performed utilizing an edge-based segmentation process. The edge-based segmentation 320 process identifies the edges of the captured image document to distinguish the captured document image from its background.

Figure 4:
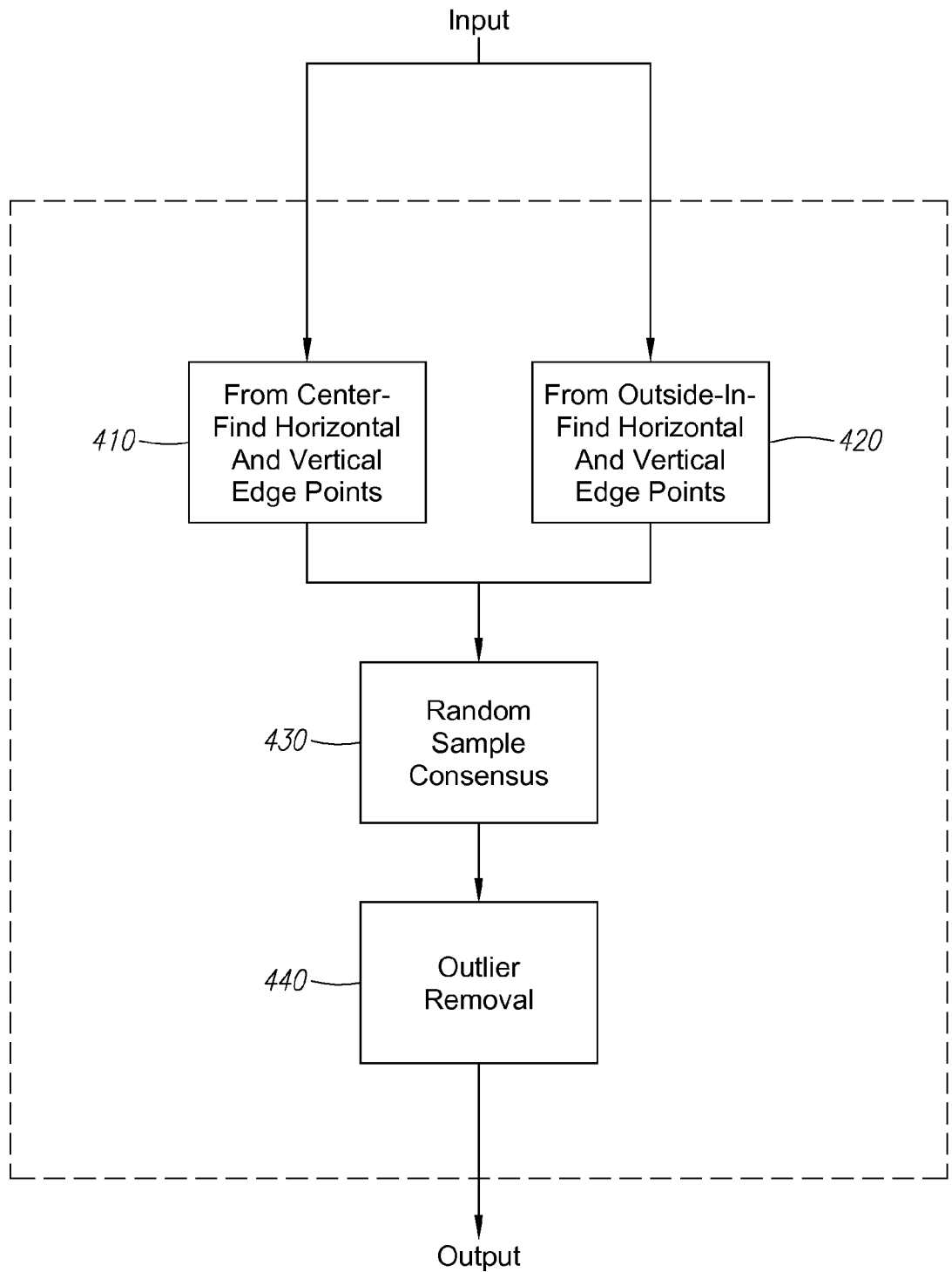
FIG. 4 depicts a flowchart of a method of performing segmentation in accordance with one of the implementations of the method of imaging a document disclosed herein.

FIG. 4 depicts a flow chart of one embodiment of an edge based segmentation 320. In this embodiment, horizontal and vertical edge points are located. This is done by searching for edge points. Edge points are determined by identifying portions of the received image that contain a transition from the background portion of the received image to the document portion of the received image. In one embodiment, the received image is scanned beginning with the center of the received image 410 and also scanned beginning from the borders of the received image 420. In one embodiment, it is assumed that the document image occupies the center of the received image. In another embodiment, it is assumed that the non-text portion of the captured document image has a pixel intensity greater than that of its background. In the scanning beginning from the center of the receive image 410, after finding an area that can be identified as document pixels, the transition to background pixels is searched along the scan. In the scanning beginning from the border of the received image 420, an area is identified as background pixels and the transition to document image pixels is identified. The process can be performed utilizing either one or both of these scans 410, 420. In one embodiment, the received image is scanned 410, 420 both in the horizontal and vertical direction.

Figure 5:
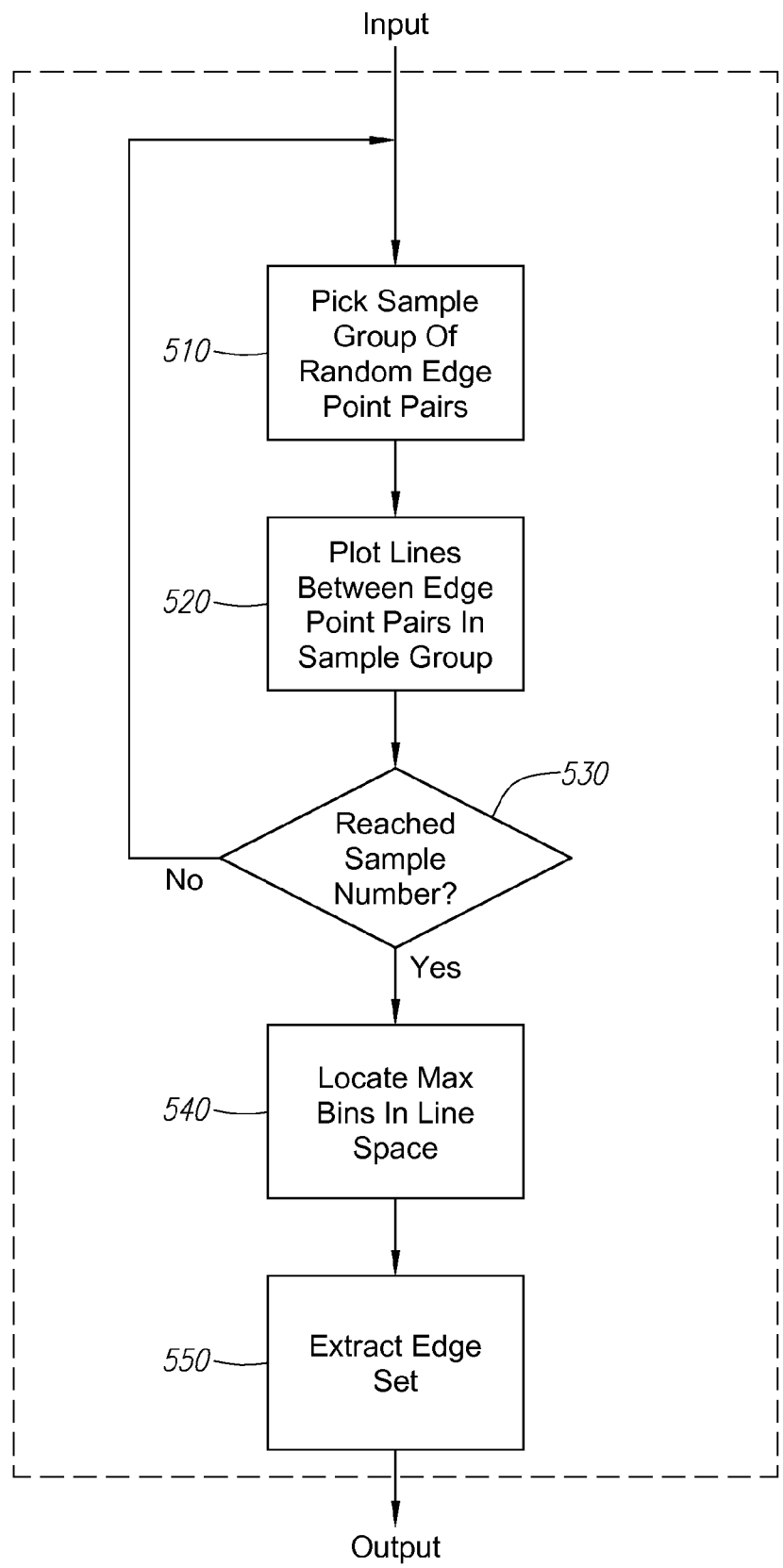
FIG. 5 depicts a flowchart of one method of performing the random sample consensus step illustrated in FIG. 4.

A random sample consensus step 430 is then performed. FIG. 5 depicts one embodiment of the random sample consensus step. In this embodiment, the random sample consensus 430 is executed by selecting two points at random 510 from the edge points selected in step 410 and 420. The line connecting these two randomly selected points is then calculated 520. In one embodiment, angle-distance coordinates are used, where the angle value corresponds to the angle of the line segment around the center of the received image and the distance value corresponds to the distance from the center of the received image to the nearest point in the line segment. In other embodiments, other coordinate systems may be used, including, for example, Cartesian coordinates or polar coordinate. These values are then stored. The process of selecting two random points from the edge points obtained in 410 and 420 is repeated to obtain a sufficient sample group 530. In one embodiment, this process is repeated five thousand times, though different sample sizes may be used. After the sampling, the pairs of points that all lie on the same line are grouped in bins. If the initial edge points selected in 410 and 420 accurately represent the edges of the document in the received image, approximately one quarter of the points will be distributed into four small ranges corresponding to the four document edges, while the remaining points will be spread generally uniformly over the rest of the possible coordinates. The four sets of grouped line segments that have the most grouped line segments 540 and meet a minimum threshold of grouped line segments are identified as representing the four edges of the document in the received image 550. In one embodiment, these collection of line segments are then determined to be the left, right, top and bottom edges according to their relative positions in the received image.

Figure 6:
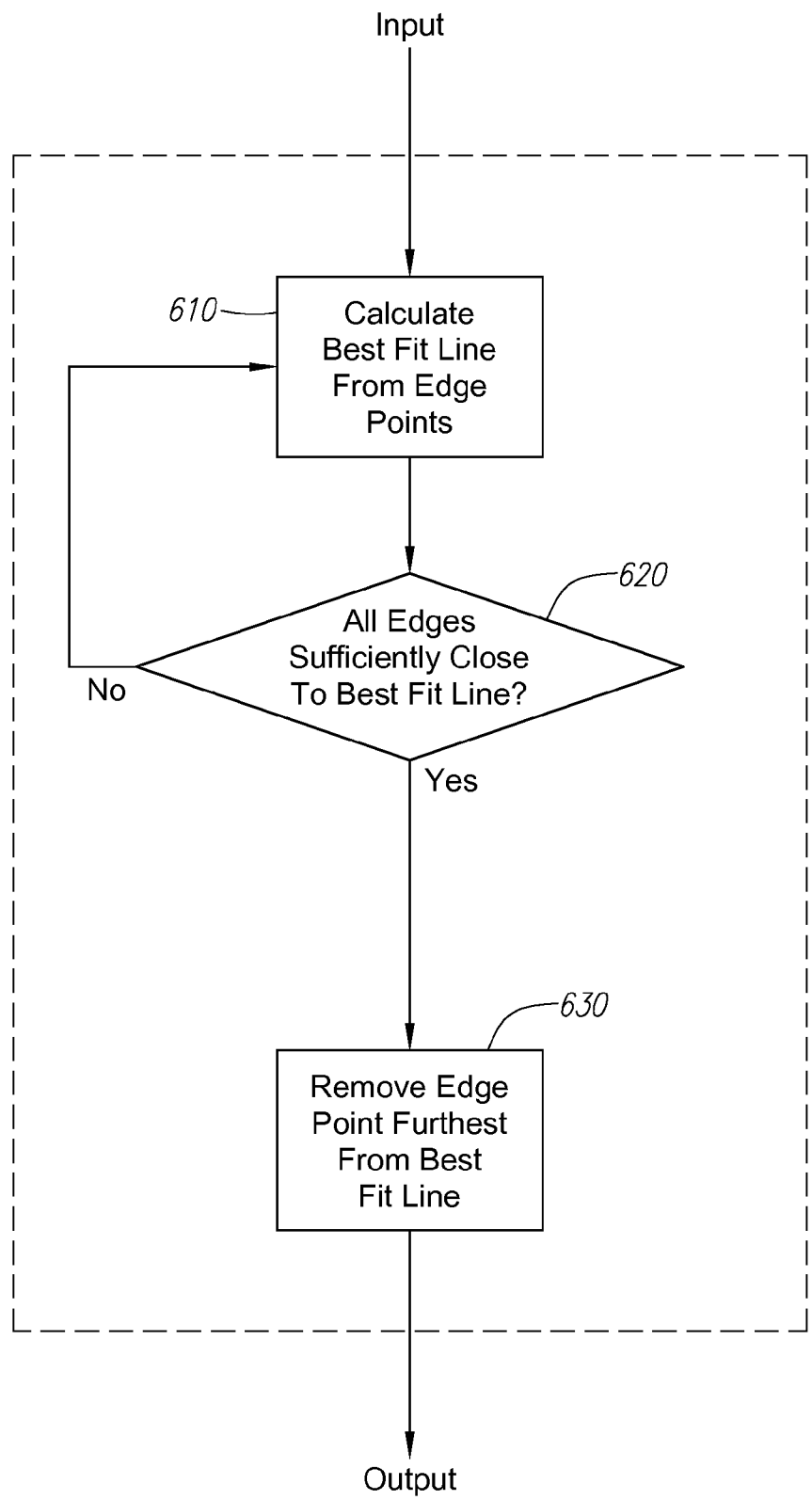
FIG. 6 depicts a flowchart of one method of performing the outlier removal step illustrated in FIG. 4.

After random sample consensus 430 is performed, in one embodiment, an outlier removal step 440 is performed among the collection of edge points to further refine the identification of the document edges. In one embodiment, depicted in FIG. 6, this is performed by conducting a linear regression between the collection of edge points corresponding to one of the edges of the received document image. In a linear regression technique, a line is drawn attempting to most accurately connect the collection of edge points 610. If the point furthest from this linear regression line is determined to be a distance sufficiently far from the linear regression line 620, the point is removed 630 and a new linear regression is performed. This process is repeated until the farthest point from the linear regression line is within a threshold value and the resulting linear regression line is determined to be the edge line. This is performed on each of the four collection of edge points representing the four edges of the received image document.

Referring back to FIG. 3, in step 325, a calculation of the accuracy of the identification of the edge lines from the edge-based segmentation 320 is determined. This step 325 may be referred to as the calculation of the confidence. In one embodiment, the confidence is calculated for each edge of the received document image and the lowest value is determined to be the overall confidence. In another embodiment, the highest confidence value among the edge lines is determined to be the overall confidence. In yet another embodiment, a combination of the confidence of the edge lines is used, such as for example an average of the confidence for the line edges, to determine the overall confidence. One embodiment for calculating the confidence of the determination of a particular line edge is to calculate the ratio between the number of pixel points remaining in that edge's collection after outlier removal 440 and the total number of pixel points that could have been found on that edge. The confidence determination can be used to improve the distortion removal 240, 350 of the received document image and can also be used to inform a user of the accuracy of the performance of the system for a particular received image. In step 330, if the confidence in the edge-based segmentation step 320 is not sufficiently high, then a content-based segmentation of step 335 is performed.

Figure 7:
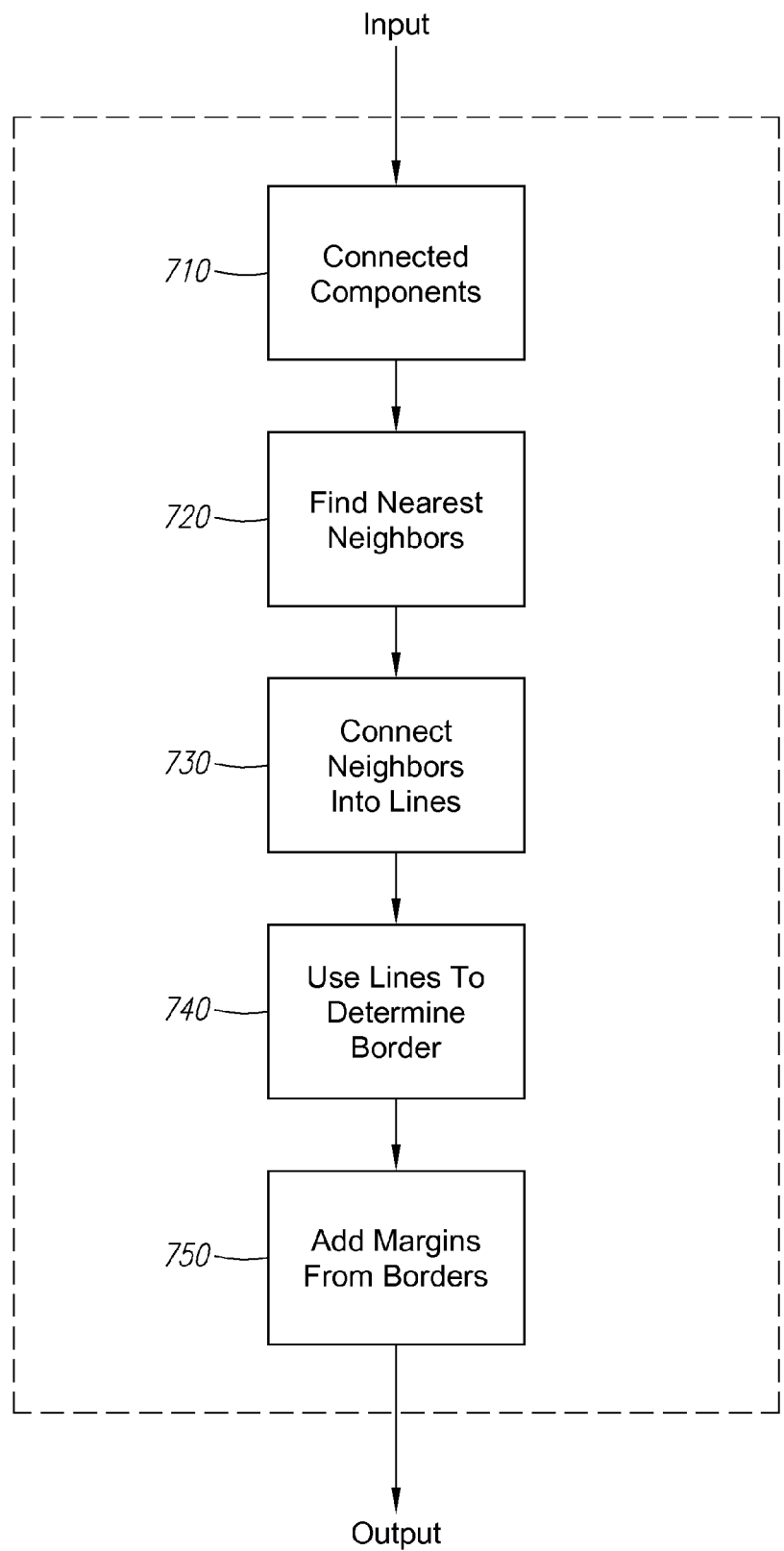
FIG. 7 depicts a flowchart for another method of performing segmentation in accordance with the method of imaging a document disclosed herein.

The content-based segmentation step 335, one embodiment of which is depicted in FIG. 7, identifies the text of the captured image document and calculates the edge of the captured image document in relation to the text. This is accomplished by identifying connected components in the received document image 710 and finding the nearest neighbor to those components 720. The connected components generally refers to those black or dark pixels that are adjacent to one another. Those adjacent pixels are then connected into lines 730, which are then used to determine the border of the text 740. From these borders, a margin is added 750 in order to identify the location of the edge of the received document image. Although the size of the margin may vary, in one embodiment, a standard margin is added in step 750.

In step 340 the corners of the captured document image are calculated. In one embodiment, the corners may be calculated from the intersection of the edge lines.

The distortion removal 240, 350 step may involve a various number of adjustments to the received image. In one embodiment, the distortion removal 240, 350 will adjust the received document image to correct for perspective distortions in the received image. For example, in situations where the picture is not taken at an angle directly above and centered upon the document, there will be a perspective distortion of the received document image.

Figure 8:
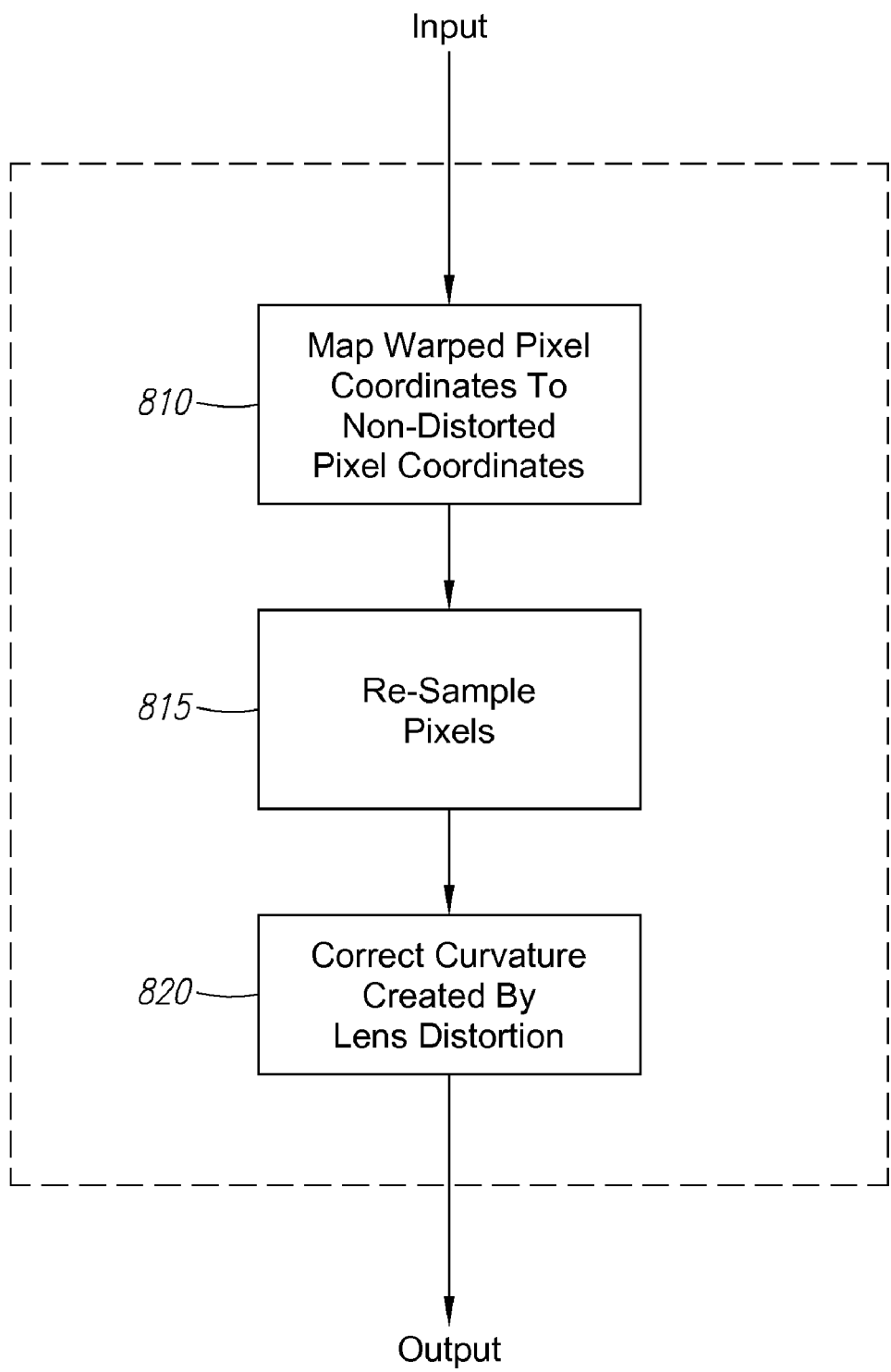
FIG. 8 depicts a flowchart of one method of performing the distortion removal steps illustrated in FIG. 2 and FIG. 3.

One embodiment for adjusting the image to correct for perspective distortion is depicted in FIG. 8. This embodiment involves mapping a set of image coordinates 810, for example (x, y), to a new set of image coordinates, for example (u, v). After the segmentation step 230, 320, 335 the four corners of the document are determined 340. Typically, in a document containing perspective distortion, these four corners will correspond to a trapezoid, whereas a document should generally have the shape of a rectangle. Thus, in one embodiment, the mapping 810 is performed between the received trapezoid to the desired rectangle. One embodiment for accomplishing this mapping 810 is to utilize a homogeneous transformation between the non-distorted pixel coordinates and the distorted pixel coordinates via a homogeneous matrix representing the transform from the distorted pixel coordinate to the non-distorted pixel coordinate, which is known in the art. The transform can be calculated by comparing the four corners determined during segmentation 230, 320, 335 with a corrected dimensions of the non-distorted received document image. In one embodiment, the need for calculating the transform at each pixel point can be avoided by simply calculating the transform for each line and utilizing linear interpolation to calculate the new pixel coordinates. After mapping new coordinates corresponding to a document having a reduced perspective distortion, a re-sampling of the pixels is performed 815.

Another aspect of the received image that may be adjusted in the distortion removal 240, 350 step is an adjustment for distortions caused by the camera lens 820. The distortion caused by a camera lens may create otherwise straight lines to curve. This distortion depends on the particular lens used and the distance of the camera from the captured image. The curvature created by lens distortion will generally be radial and, therefore, a uniform radial adjustment for the lens distortion can be performed using a parameter approximating the degree of lens distortion. This parameter may be either calculated by the system or inputted by the user.

Yet another aspect of the received image that may be adjusted in the distortion removal 240, 350 step is an adjustment for distortions caused by the document not being entirely flat. For example, if the imaged document is a page in a book, the page may have a curvature that creates a distortion when captured photographically. This distortion may also be corrected in the distortion removal step 240, 350. Other distortions may also be corrected and the description of particular types of distortion herein is not intended to limit the types of distortion that may be reduced or removed.

In step 365, a thresholding process is performed on the image created in step 360. The thresholding process 365 reduces the color depth of the image and has the potential advantage of reducing the distortion created by a flash that may be used when photographing the image. In one embodiment, the thresholding process 365 reduces the twenty-four bit color images to one bit black-and-white images. The potential benefits of reducing the images to black and white is the reduction of the effects introduced by the camera's flash and the reduction of the amount of information required by the system 300 to process. The thresholding 365 can be performed in a number of ways. One embodiment may utilize a dithering technique, which is known in the art. An example of a dithering technique may be found in existing image software, such as the SNOWBOUND® IMAGE LIBRARY by Snowbound Software Corporation. One shortcoming of using a dithering technique, however, is the introduction of noise into the image. Another embodiment for thresholding 365 involves selecting a global threshold for an image. In such a technique, a threshold value is selected. Those pixels having an intensity greater than the threshold value are deemed white and the remaining pixels are deemed black. The threshold value may be selected in a number of ways. In one embodiment, the threshold value is selected and applied for all received images. This technique has the shortcoming of not accounting for the varied light conditions in the received images. In another embodiment, the threshold value is calculated from an analysis of the received image, such as its histogram. In one such embodiment involving the analysis of the received image, an assumption is made that the received image contains two peaks in its intensity histogram corresponding to the foreground and background of the received document image. This embodiment may not perform well for those images to which the assumption does not apply. Another embodiment for thresholding 365 is to select a separate threshold value for each pixel in the received image. This embodiment has the advantage of responding to changing conditions within the document, such as lighting changes or background contrasts. One embodiment of this technique is referred to as adaptive thresholding. In this embodiment, previous pixel values are considered as each new pixel is analyzed for determination of the threshold value. One way to accomplish this is by calculating the weighted average of each pixel as each progressive pixel of the received image is analyzed. One potential shortcoming of this embodiment is the introduction of noise if the received image comprises a colored document.

Figure 9:
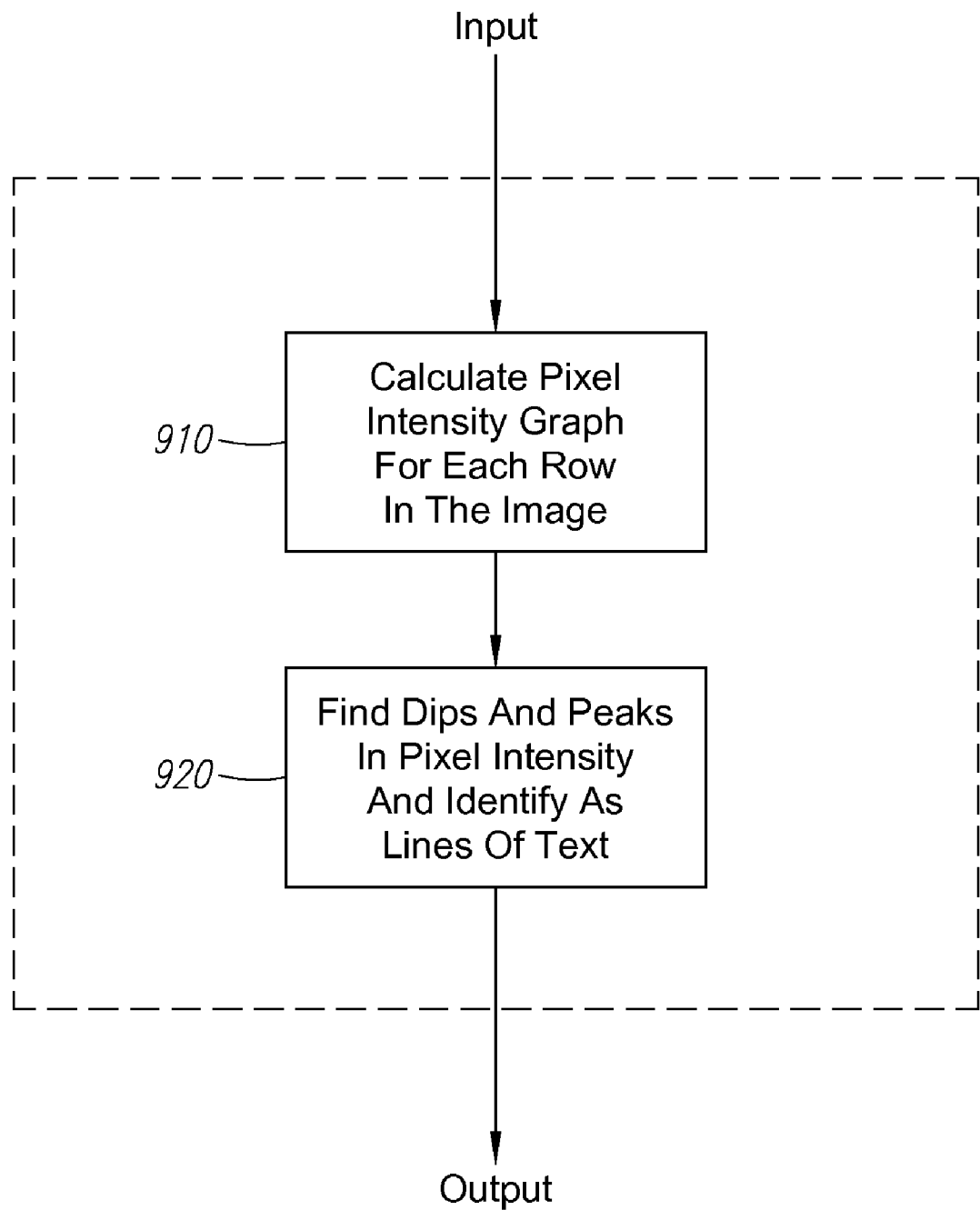
FIG. 9 depicts a flowchart of one method of performing the lines of text step illustrated in FIG. 3.

In step 370 the lines of text step is performed. In this step 370, the system determines the lines of text in the received document image. FIG. 9 depicts one embodiment of the lines of text 370. In one embodiment, the system assumes that the pixels corresponding to text in the received document image have a lower intensity than the background pixels of the received document image. In this embodiment, the sum of the intensities of all of the pixels within each of the rows of the received document image is calculated 910. These sums are then used to identify local peaks and valleys in the pixel intensity 920. These peaks and valleys are then analyzed to determine the lines of text in the document. For example, if the received document image has black lines of text with a white background, the lines of pixels that are entirely white will have the highest total intensities and the lines containing the black text will have substantially lower pixel intensity. These differences in intensity can then be calculated and the lines of text can thereby be determined. In a preferred embodiment, the lines of text 370 is executed both horizontally and vertically across the received document image.

Another embodiment for performing lines of text 370 is to perform a similar search for the lines of text as that performed in step 335. In one such embodiment, the text of the captured document image is identified and formed into lines. This may be accomplished by identifying the connected components in the captured document image and finding the nearest neighbor to those components. The connected components generally refer to those black or darker pixels that are adjacent to one another. Those adjacent pixels are then connected into lines. This process is similar to that described in steps 710, 720 and 730 of FIG. 7.

Step 375 determines whether the captured document image should be in a landscape or portrait format. In one embodiment, this is accomplished by comparing the result of the lines of text 370 result in the vertical direction with the lines of text 370 result in the horizontal direction. In one embodiment, the direction resulting with the greater number of lines is determined to define the received document image's orientation. For example, in a received document image that has a height greater than its width, if the lines of text 370 in the vertical direction yields a greater number of lines than the lines of text 370 in the horizontal direction, then the received image document is determined to have landscape orientation. As another example, if in the same received image document the lines of text 370 in the horizontal direction yields a greater number of lines than the lines of text 370 in the vertical direction, then the received image document is determined to have a portrait orientation.

Figure 10:
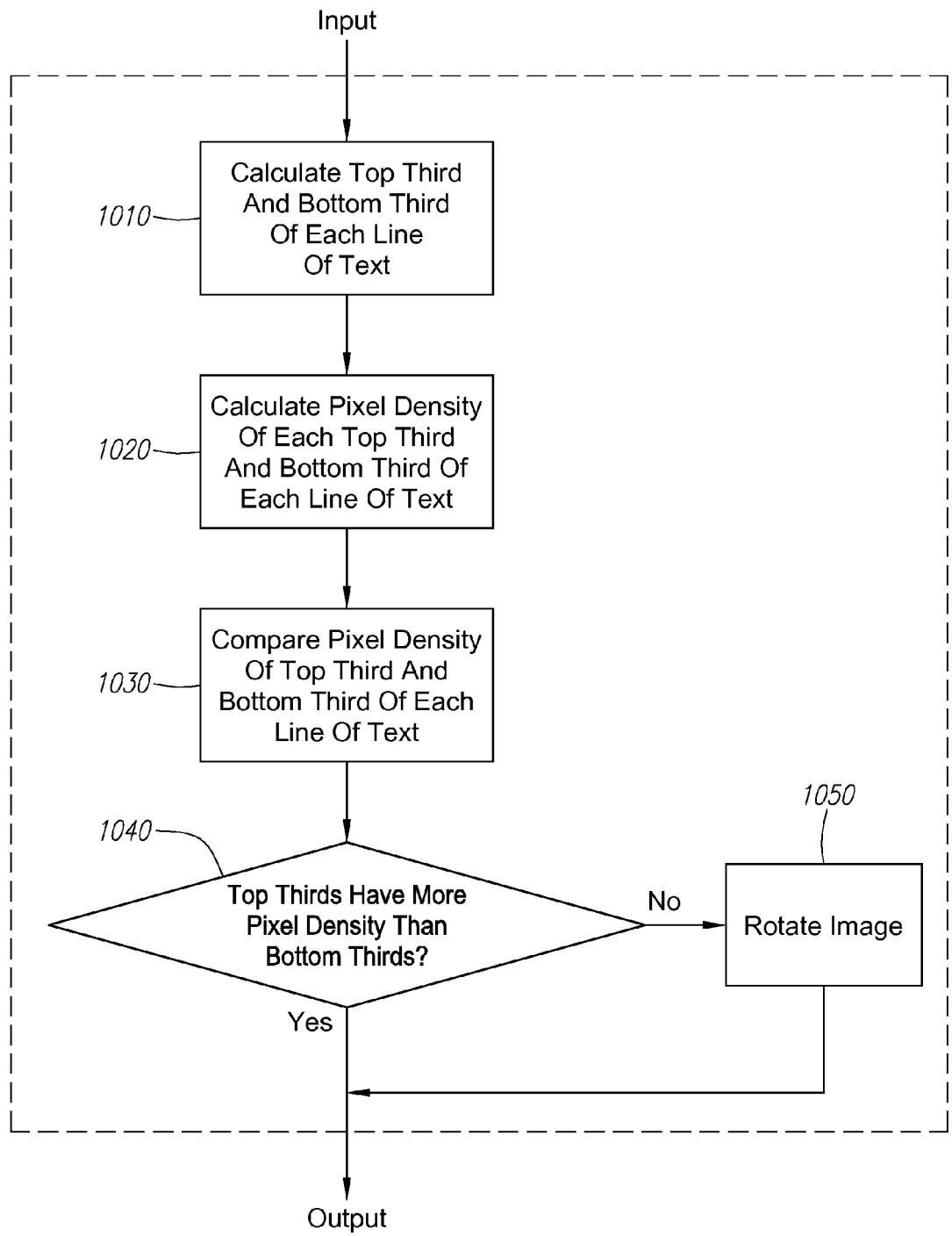
FIG. 10 depicts a flowchart of one method of determining whether a document is properly oriented in an upright manner in accordance with one implementation of the method of imaging a document disclosed herein.

Step 380 determines the upright orientation of the document. FIG. 10 depicts one embodiment of determining whether the received document image is properly oriented upright 380. In one embodiment, each line of text is analyzed. A fewer number of lines of text may be analyzed, but this may result in a less reliable result. In one embodiment, each line of text is divided into three sections 1010: an ascending section, a middle section and a descending section. English language characters contain certain inherent statistical characteristics that may be used in certain embodiments to determine the upright orientation of the received document image. For example, the English language alphabet has only five characters that descend below the bottom boundary of a sentence (i.e. g, j, p, q and y) and has many more characters that ascend above the top boundary of a sentence (e.g. b, d f, h, i, k, l). In one embodiment, this characteristic of the English language characters can be considered when calculating the respective number of pixels contained in the ascending section and the descending section 1020 and comparing those pixel densities 1030, 1040. For example, a received document image having English language characters that has more ascending character pixels than descending character pixels is likely in the upright position and does not need to be rotated, whereas if the same document has more descending character pixels than ascending character pixels, the document likely needs to be rotated one-hundred and eighty degrees 1050.

In other embodiments, other characteristics of English language characters can also be considered. For example, characteristics of pixel location in the horizontal direction can be considered. Further, non-statistical methods can also be used to determine the upright orientation of the document, such as optical character recognition ("OCR"). Another embodiment could utilize a neural net approach. In addition, similar inherent characteristics can be utilized for non-English documents. For example, Spanish language characters are similar to those in English and will have similar inherent characteristics. As another example, Arabic language characters contain a greater number of descending characters and embodiments may adjust for those characteristics accordingly.

Figure 12:
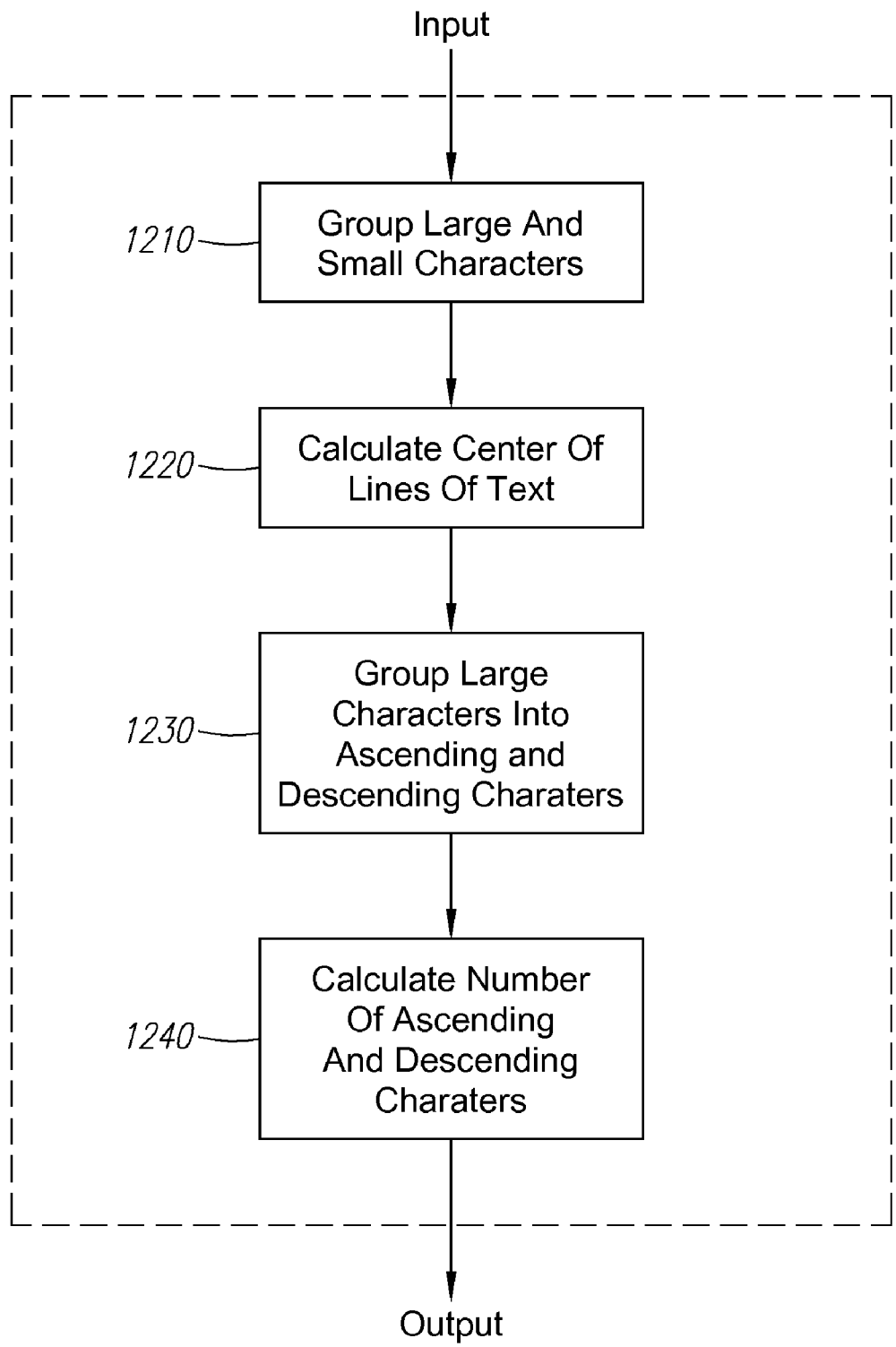
FIG. 12 depicts a flowchart of one method of determining whether a document is oriented in an upright manner in accordance with one implementation of the method of imaging a document disclosed herein.

FIG. 12 depicts another embodiment for performing step 380 and determining whether the received document image is properly oriented upright 380. In one embodiment, the connected components are used to determine each letter line of text. Each component is classified by height into two categories, small and large 1210. The center of the lines of text are determined 1220. In one embodiment, the small letters' heights are used to determine the center of the line of text 1220. This may improve the estimate of the line-of-text's center if it is distorted, such as if it is curved across the page. The large letters are then matched against the center of the lines of text, and are grouped as ascending or descending based on the relative location to this center 1230. The total number of ascending and descending letters are calculated. In a typical English language document, the large characters will ascend towards the top of the page. Therefore, in one embodiment, if the number of ascending large characters is greater than the number of descending ones, then the document does not need to be rotated in step 385 prior to outputting in step 390. If, however, the number of descending large characters is greater than the number of ascending larger characters, then the document is rotated in step 385 prior to outputting in step 390.

The image is then rotated in step 385 according the determinations of steps 380 and 375. The new document image is then outputted 390.

Figure 11:
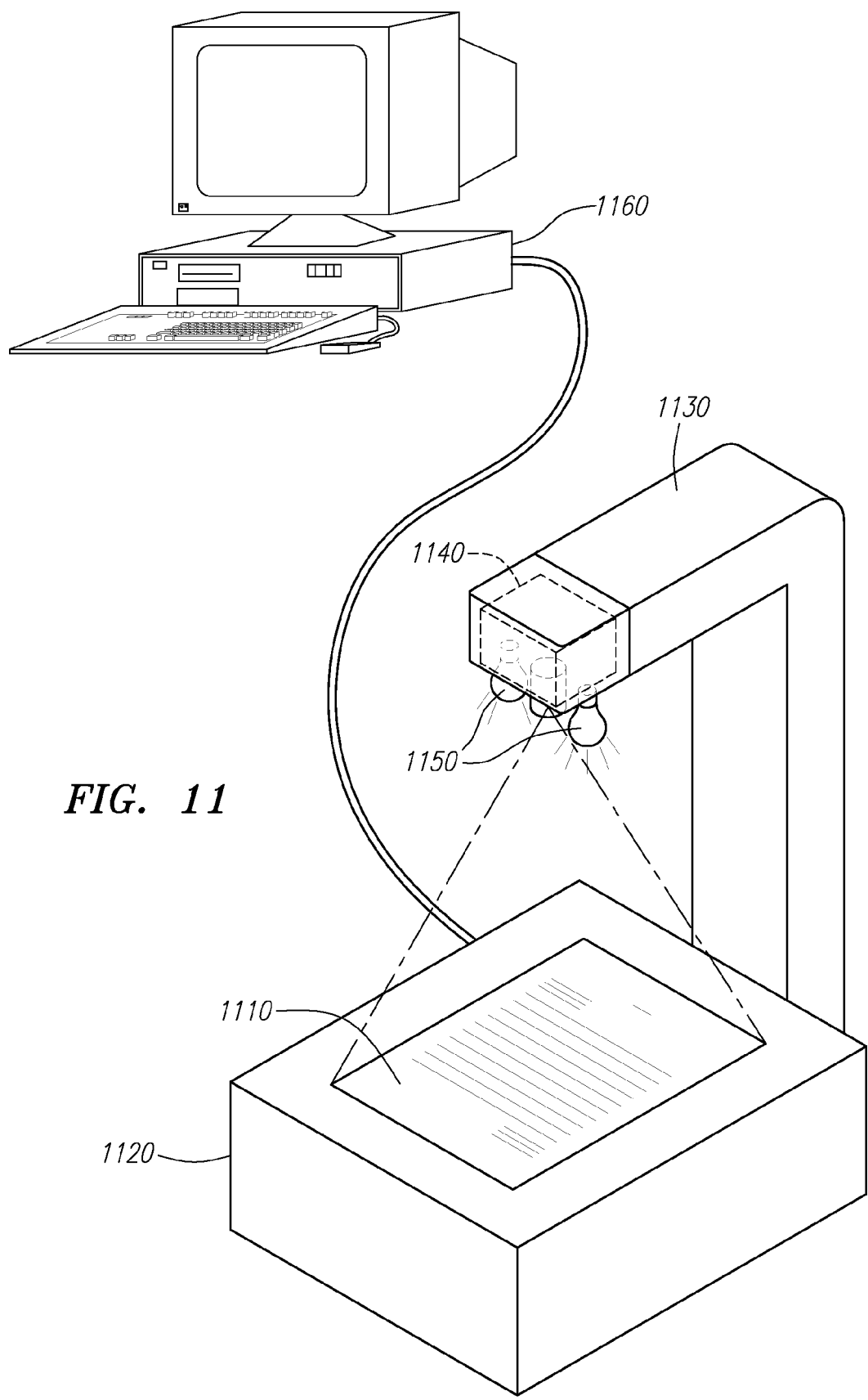
FIG. 11 depicts one embodiment of an apparatus for capturing and processing an image including an imaged document.

As discussed above, the system imaged documents may be captured in either a film camera or digital camera. As an alternative to these freeform devices, a stationary camera system may be employed to capture the imaged documents. FIG. 11 depicts an embodiment for a stationary camera system for capturing a document image. In this embodiment, the document 1110 is placed on the base 1120 of the system. In a preferred embodiment, the base 1120 of the system is of a pre-determined color, which may have the advantage of facilitating the segmentation process, discussed above. Extending from the base 1120 is the stand 1130, which may house a camera 1140 and lighting 1150. The camera and lighting may be permanently housed in the stand 1130 or may be removable or adjustable. The lighting may be placed anywhere on the base 1120 or stand 1130. In another embodiment, no additional lighting is included on the base 1120 or stand 1130. In still another embodiment, the lighting is separate from the base 1120 or stand 1130. The stationary system is then coupled to a computer 1160 to perform the above-described processing of the received image document. In another embodiment, the computer may also be built into the apparatus. In still another embodiment, the captured image document may simply be stored either in the digital camera 1140 or in another memory source and later coupled to a computer for processing. Such a stationary camera system can be placed as part of a user's workstation in, for example, an office.

There are several advantages of utilizing a stationary camera system as opposed to a freeform camera. For example, in utilizing a stationary camera system, the amount of perspective distortion may be reduced, since the document is more likely to be perpendicular and centered with respect to the camera lens. In addition, another advantage may be to allow the system to better adjust for lens distortion, since the distance between the camera and the lens used will be known, thereby reducing the need to calculate or approximate these parameters. Another potential advantage would be to reduce the distortions created by a camera flash. In a preferred embodiment the lighting 1150 of the stationary system would be positioned so as to reduce glare and other distortions created by camera flashes.

The approach described herein for processing a captured image is applicable to any type of processing application and (without limitation) is particularly well suited for computer-based applications for processing captured images. The approach described herein may be implemented in hardware circuitry, in computer software, or a combination of hardware circuitry and computer software and is not limited to a particular hardware or software implementation.

Figure 13:
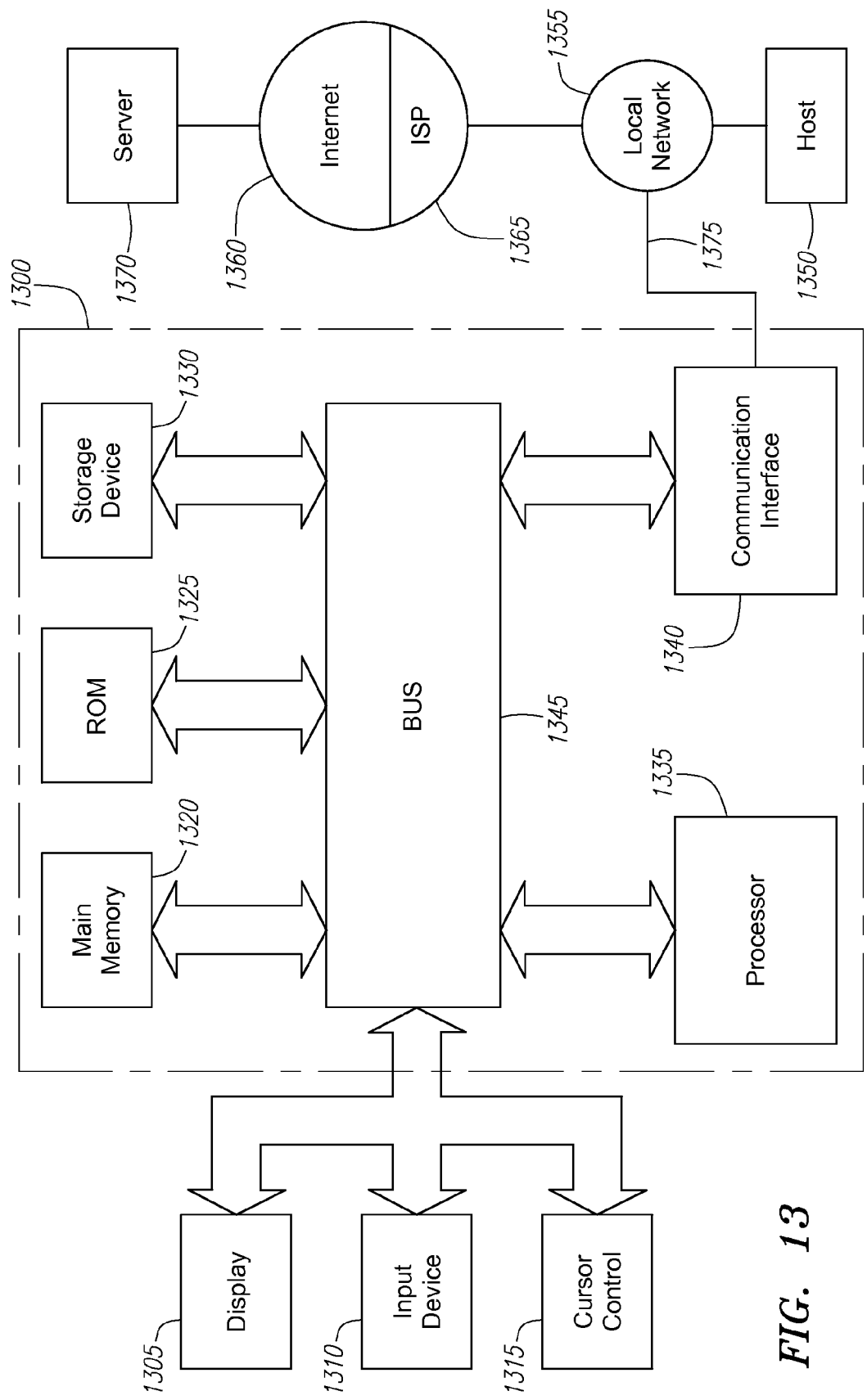
FIG. 13 depicts one embodiment of a system for processing a captured image.

FIG. 13 is a block diagram that illustrates a computer system 1300 upon which an embodiment of the invention may be implemented. Computer system 1300 includes a bus 1345 or other communication mechanism for communicating information, and a processor 1335 coupled with bus 1345 for processing information. Computer system 1300 also includes a main memory 1320, such as a random access memory (RAM) or other dynamic storage device, coupled to bus 1345 for storing information and instructions to be executed by processor 1335. Main memory 1320 also may be used for storing temporary variables or other intermediate information during execution of instructions to be executed by processor 1335. Computer system 1300 further includes a read only memory (ROM) 1325 or other static storage device coupled to bus 1345 for storing static information and instructions for processor 1335. A storage device 1330, such as a magnetic disk or optical disk, is provided and coupled to bus 1345 for storing information and instructions.

Computer system 1300 may be coupled via bus 1345 to a display 1305, such as a cathode ray tube (CRT), for displaying information to a computer user. An input device 1310, including alphanumeric and other keys, is coupled to bus 1345 for communicating information and command selections to processor 1335. Another type of user input device is cursor control 1315, such as a mouse, a trackball, or cursor direction keys for communication of direction information and command selections to processor 1335 and for controlling cursor movement on display 1305. This input device typically has two degrees of freedom in two axes, a first axis (e.g. x) and a second axis (e.g. y), that allows the device to specify positions in a plane.

The methods described herein are related to the use of computer system 1300 for processing a captured image. According to one embodiment, the processing of the captured image is provided by computer system 1300 in response to processor 1335 executing one or more sequences of one or more instructions contained in main memory 1320. Such instructions may be read into main memory 1320 from another computer-readable medium, such as storage device 1330. Execution of the sequences of instructions contained in main memory 1320 causes processor 1335 to perform the process steps described herein. One or more processors in a multi-processing arrangement may also be employed to execute the sequences of instructions contained in main memory 1320. In alternative embodiments, hard-wired circuitry may be used in place of or in combination with software instructions to implement the embodiments described herein. Thus, embodiments described herein are not limited to any specific combination of hardware circuitry and software.

The term "computer-readable medium" as used herein refers to any medium that participates in providing instructions to processor 1335 for execution. Such a medium may take many forms, including, but limited to, non-volatile media, volatile media, and transmission media. Non-volatile media includes, for example, optical or magnetic disks, such as storage device 1330. Volatile media includes dynamic memory, such as main memory 1320. Transmission media includes coaxial cables, copper wire and fiber optics, including the wires that comprise bus 1345. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1335 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector coupled to bus 1345 can receive data carried in the infrared signal and place the data on bus 1345. Bus 1345 carries the data to main memory 1320, from which processor 1335 retrieves and executes the instructions. The instructions received by main memory 1320 may optionally be stored on storage device 1330 either before or after execution by processor 1335.

Computer system 1300 also includes a communication interface 1340 coupled to bus 1345. Communication interface 1340 provides a two-way data communication coupling to a network link 1375 that is connected to a local network 1355. For example, communication interface 1340 may be an integrated services digital network (ISDN) card or a modem to provide a data communication to a corresponding type of telephone lines. As another example, communication interface 1340 may be a local area network (LAN) card to provide a data communication connection to a compatible LAN. Wireless links may also be implemented. In any such implementation, communication interface 1340 sends and receives electrical, electromagnetic or optical signals that carry digital data streams representing various types of information.

Network link 1375 typically provides data communication through one or more networks to other data services. For example, network link 1375 may provide a connection through local network 1355 to a host computer 1350 or to data equipment operated by an Internet Service Provider (ISP) 1365. ISP 1365 in turn provides data communication services through the world wide packet data communication network commonly referred to as the "Internet" 1360. Local network 1355 and Internet 1360 both use electrical, electromagnetic or optical signals that carry digital data streams. The signal through the various networks and the signals on network link 1375 and through communication interface 1340, which carry the digital data to and from computer system 1300, are exemplary forms of carrier waves transporting the information.

Computer system 1300 can send messages and receive data, including program code, through the network(s), network link 1375 and communication interface 1340. In the Internet example, a server 1370 might transmit requested code for an application program through Internet 1360, ISP 1365, local network 1355 and communication interfaced 1340. In accordance with the invention, one such downloaded application provides for processing captured images as described herein.

The receive code may be executed by processor 1335 as it is received, and/or stored in storage device 1330, or other non-volatile storage for later execution. In this manner, computer system 1300 may obtain application code in the form of a carrier wave.

The invention claimed is:

1. An apparatus for capturing and processing an image comprised of a document, comprising:
   a base for supporting the document;
   a stand extending vertically from said base, wherein said stand houses a digital camera positioned to capture an image of the document; and
   a system means for storing and processing said image coupled to said digital camera, wherein said system means includes:
      a computer readable storage medium for processing said image, the computer readable storage medium carrying one or more sequences of one or more instructions which, when executed by one or more processors, cause the one or more processors to perform the computer-implemented steps of:
      detecting graphical information in said captured image related to edges of said imaged document;
      isolating said imaged document from background of said captured image based on the graphical information related to edges of said imaged document;
      computing deviations of said imaged document from a non-distorted perspective of said imaged document;
      mapping pixels of said imaged document to a new image of said imaged document using said computed deviations;
      resampling pixels of said new image;
      detecting graphical information in said new image of said imaged document related to the orientation of said imaged document in said new image; and
      rotating said new image based on the graphical information related to the orientation of said imaged document in said new image.

2. An apparatus for capturing and processing an image comprised of a document, comprising:
   a base for supporting the document;
   a stand extending vertically from said base, wherein said stand houses a digital camera positioned to capture an image of the document; and
   a system means for storing and processing said image coupled to said digital camera, wherein said system means includes:
      a computer readable storage medium for processing said image, the computer readable storage medium carrying one or more sequences of one or more instructions which, when executed by one or more processors, cause the one or more processors to perform the computer-implemented steps of:
      detecting graphical information in the captured image relating to the transition between said imaged document and the remainder of said captured image;
      selecting one or more lines from said graphical information corresponding to edges of said imaged document;
      calculating corners of said imaged document based on intersections of said one or more lines corresponding to edges of said imaged document;
      isolating said imaged document from background of said captured image based on said one or more lines corresponding to edges of said imaged document;
      computing deviations of said imaged document from a non-distorted perspective of said imaged document; and
      generating a new image of said imaged document with reduced perspective distortion based on said computed deviations.

3. A kit for capturing and processing an image comprised of a document, comprising:
   a stand for supporting a digital camera positioned to capture an image of the document;
   a computer readable storage medium for processing said image, the computer readable storage medium carrying one or more sequences of one or more instructions which, when executed by one or more processors, cause the one or more processors to perform the computer-implemented steps of:
   detecting graphical information in said captured image related to edges of said imaged document;
   isolating said imaged document from background of said captured image based on the graphical information related to edges of said imaged document;
   computing deviations of said imaged document from a non-distorted perspective of said imaged document;
   resampling pixels of said imaged document based on said computed deviations;
   detecting graphical information in said captured image related to the orientation of said imaged document;
   rotating said imaged document based on the graphical information related to the orientation of said imaged document.

4. A kit for capturing and processing an image comprised of a document, comprising:
   a digital camera for capturing an image of the document;
   a computer readable storage medium for processing said image, the computer readable storage medium carrying one or more sequences of one or more instructions which, when executed by one or more processors, cause the one or more processors to perform the computer-implemented steps of:
   detecting graphical information in the captured image relating to the transition between said imaged document and the remainder of said captured image;
   selecting one or more lines from said graphical information corresponding to edges of said imaged document;

calculating corners of said imaged document based on intersections of said one or more lines corresponding to edges of said imaged document;

isolating said imaged document from background of said captured image based on said one or more lines corresponding to edges of said imaged document;

computing deviations of said imaged document from a non-distorted perspective of said imaged document; and generating a new image of said imaged document with reduced perspective distortion based on said computed deviations.

5. A kit as recited in claim 4, further comprising:

a stand for housing the digital camera.

* * * * *